July 31, 1934.   E. W. DAVIS   1,968,017
LUBRICATING APPARATUS
Filed April 1, 1929
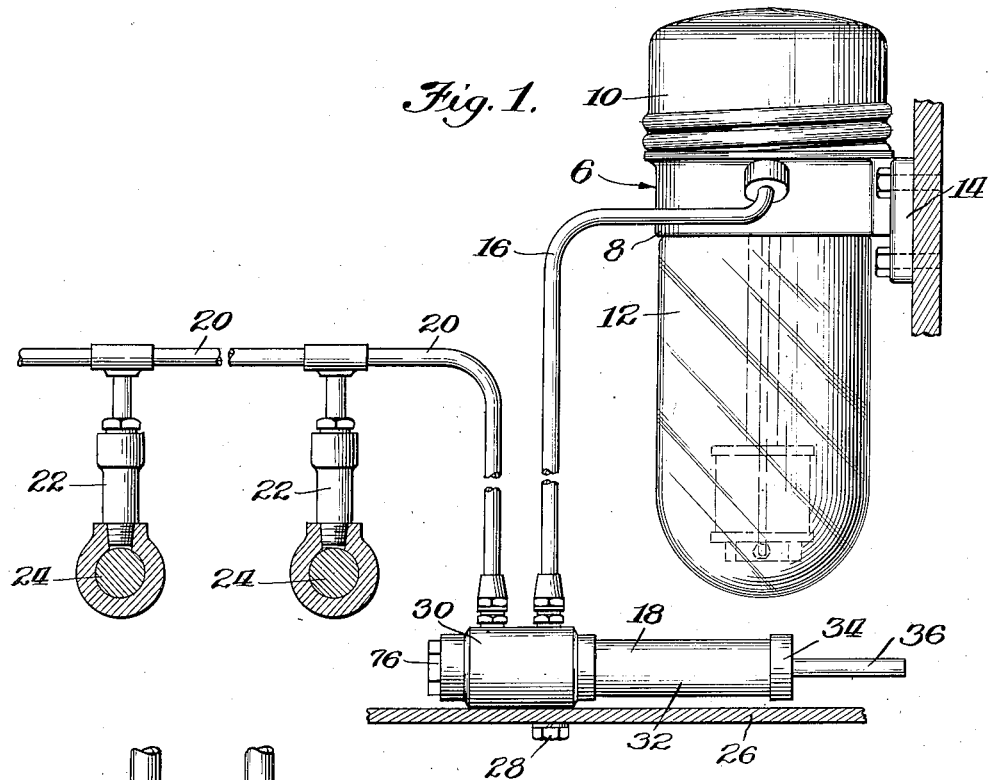
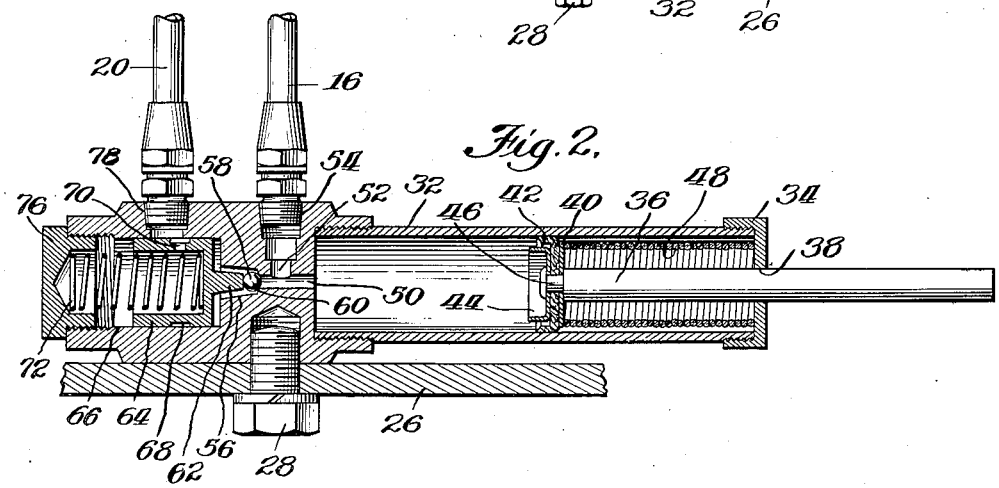
Inventor
Ernest W. Davis
By Williams Bradbury McCaleb & Hinkle
Attys.

Patented July 31, 1934

1,968,017

UNITED STATES PATENT OFFICE 1,968,017

LUBRICATING APPARATUS

Ernest W. Davis, Oak Park, Ill., assignor to Alemite Corporation, Chicago, Ill., a corporation of Delaware Application April 1, 1929, Serial No. 351,695

8 Claims. (Cl. 184—7)

My invention relates generally to lubricating apparatus and more particularly to accumulators for use in centralized lubricating systems.

It is an object of my invention to provide an improved simple accumulator for storing up the lubricant supplied by the pump of the system until a predetermined pressure is attained and thereupon to discharge the lubricant to the bearings requiring lubrication.

A further object is to provide a device of the above described type which is simple in construction and may be economically manufactured.

Other objects will appear from the following description, reference being had to the accompanying drawing, in which Fig. 1 is an elevation of a lubricating system in which the accumulator of my invention is embodied; and Fig. 2 is a central vertical section of the accumulator.

In Fig. 1 I have shown a more or less conventional central lubricating system such as is commonly installed upon automotive vehicles and other machines.

In many systems of this type small quantities of lubricant are supplied to the system at regular intervals by various types of pumps. The pump 6 illustrated in the drawing is of the well-known inertia operated type such as shown in my copending application Serial No. 351,694, filed April 1, 1929 and comprises generally a body 8 upon which the pumping mechanism is mounted, a removable cover 10, and a reservoir 12, the pump being adapted to be attached to a suitable movable support by a bracket 14. The pump is of course provided with the usual outlet check valve.

The discharge port of the pump is connected by a conduit 16 to the inlet port of the accumulator 18. The discharge port of the accumulator is connected by suitable conduits and pipe connections 20 to resistance fittings 22 which are preferably screwed directly into the oil holes of the bearings 24 to be lubricated. In lieu of using resistance fittings 22, measuring valves of any well-known type may be employed.

While I have shown the connections to but two bearings to be lubricated, it will be understood that a large number of bearings are customarily lubricated from a single source, and the two bearings shown are representative of such a large group.

The accumulator may be attached to a suitable support 26 by a cap screw 28 which is threaded to the body 30 of the accumulator. One end of the body is bored and threaded to receive a tubular cylinder 32, over the outer end of which a cap 34 is threaded.

A stem 36 is guided in a central aperture 38 formed in the cap 34 and at its inner end carries a piston comprising a backing plate 40, a cup leather 42 and an annularly flanged face plate and limit stop 44, the parts 40, 42 and 44 being secured to the stem 36 by riveting over the reduced end portion 46 of the stem.

A compression coil spring 48 has one end abutting the cap 34 and the other end abutting the backing plate 40. When the piston is in its leftmost position the spring 48 is under considerable initial compression.

The body 30 has a drilled passageway 50 communicating with the interior of the cylinder 32 and also with the inlet 52 at which the conduit 16 is secured by a suitable compression coupling 54. The left-hand end of the passageway 50 terminates in an enlarged tapered recess 56 which provides a chamber for a ball valve 58. The ball valve is normally engaged by and held against a valve seat 60 by a frusto-conical projection 62 formed on a piston shaped member 64 which is slidable in a cylindrical bore 66.

The member 64 has an annular groove 68 and a port 70 to afford communication to the inside of the member. A comparatively light compression coil spring 72 tends to hold the member 64 in its right-hand position as shown in the drawing, the spring being seated in a recess formed in a threaded plug 76 which closes the end of the bore 66.

The conduit 20 which leads to the various bearings to be lubricated is connected with the body 30 by a bushing 78 so as to communicate with the bore 66.

In operation the pump 6 which, as intimated, may be either inertia operated or operated by the engine manifold vacuum, may be electrically operated or operated by any other convenient source of power, will more or less continuously force small quantities of lubricant through the conduit 16 into the accumulator.

The lubricant will flow through the inlet port 52, passageway 50, and thence into the cylinder 32, causing the piston therein to be moved to the right (Fig. 2). When the spring 48 has been compressed a predetermined amount, that is, the pressure within the cylinder risen to a predetermined degree, the lubricant pressure acting on the exposed surface of the ball valve 58 will force the latter from its seat. As soon as the valve 58 is unseated, lubricant pressure is exerted over the entire face of the piston-like member 64 and will thus move the latter to the left until it uncovers the outlet port and permits lubricant to flow outwardly through the conduit 20. This flow of lubricant will continue until the spring 48 has forced all or the greater part (dependent upon the resistance to flow in the conduit system, resistance units, and bearings) of lubricant from the cylinder 32 to the bearings to be lubricated. During the leftward movement of the member 64 lubricant to the left thereof may escape through the opening 70 and annular groove 68 to the conduit 20. After the pressure in the conduit 20 is restored substantially to the pressure in the cylinder 32, the spring 72 will force the member 64 to the right, whereupon the projection 62 will engage and reseat the ball valve 58.

The above action of the accumulator will normally be continuously repeated as long as the pump is in operation. The bearings will be intermittently supplied with a comparatively large charge of lubricant within a short time and thus the tendency of one or more of the resistance units to permit passage of most of the lubricant from the pump when the latter is operating continuously at a low pressure, is overcome, because the actual differences in the quantities of lubricant passed by a number of resistance fittings having slightly different characteristics, is less when the lubricant is supplied at high pressure at intervals than if the lubricant is supplied to the fittings continuously under low pressure.

This is particularly true when spring controlled check valves constitute a part of the resistance fittings and when, as in summer, the lubricant is of low viscosity.

When the lubricant is of high viscosity, and the resistance to flow of the lubricant through the various fittings is therefore comparatively high, the accumulator piston may operate only through a portion of its full stroke, or when the viscosity of the lubricant is extremely high, may be held in the position shown in Fig. 2, with its spring 48 fully compressed, whereupon the lubricant will in effect be forced directly from the pump to the conduit system without the accumulator having any effect upon the operation of the system. The accumulator thus automatically controls the supply of lubricant to the bearings, dependent upon the viscosity of the lubricant and the resistance to flow of lubricant through the resistance fittings and conditions the system for most effective operation under the existing conditions.

The above-described lubricating system and accumulator arrangement also has peculiar applicability to systems using measuring valves at or near each of the bearings to be lubricated since through the use of this accumulator the discharge from a continuously operating pump is stored up and suddenly forced to all of the measuring valves to cause their complete and efficient operation.

The accumulator, it will be seen, is of extremely simple construction and may thus be very economically manufactured. There are practically no parts which will easily get out of order and the device is thus well adapted to accomplish the objects primarily stated.

The invention is capable of wide variation within equivalent limits and I contemplate such variation as may be desirable or useful in the particular adaptation of the invention shown, or in its adaptation to other apparatus. I do not restrict myself in any unessential particulars, but what I claim and desire to secure by Letters Patent is:

1. An accumulator for centralized lubricating systems comprising a body having inlet and outlet ports, a resilient pressure reservoir communicating with said inlet port, a passageway between said reservoir and said outlet port, a valve normally obstructing said passageway, and a spring pressed member for holding said valve in normal position, said member having a relatively large surface exposed to the pressure of lubricant in said passageway when said valve is opened.

2. In a centralized lubricating system, the combination of a plurality of bearings requiring lubrication, a conduit system for supplying lubricant to said bearings, means in said conduit system for apportioning lubricant among said bearings, a pump for supplying lubricant under pressure to said conduit system, and an accumulator intermediate said pump and said conduit system, said accumulator comprising a resilient pressure reservoir connected in communication with the discharge outlet of said pump, and having a passageway from said reservoir to said conduit system, a check valve normally closing said passageway, a spring for holding said check valve closed until the pressure in said reservoir exceeds a predetermined value, and means responsive to the pressure of the lubricant in said reservoir when said valve is open to relieve said valve of a portion of the force of said spring.

3. An accumulator for centralized lubricating systems comprising a body having inlet and outlet ports, a resilient pressure reservoir communicating with said inlet port, a passageway between said reservoir and said outlet port, a ball check valve normally obstructing said passageway, and a spring pressed member for holding said ball valve in normal position, the spring associated with said member being sufficiently strong to hold said valve in obstructing position against all pressures less than a predetermined relatively high lubricant pressure in said reservoir, said spring pressed member and valve being the sole means for controlling the flow of lubricant from said reservoir.

4. In a device of the class described, the combination of a body having inlet and outlet ports, a pressure reservoir in communication with said inlet port, said body having a passageway from said reservoir to said outlet port, said passageway having an enlarged portion, a valve in the enlarged portion of said passageway to control flow therethrough, a piston-shaped member having a projection normally engaging said valve and having a surface subjected to the pressure of the lubricant in said reservoir when said valve is open, and a spring for moving said member toward said valve to hold the latter in a position closing said passageway, the tension of said spring being sufficiently great to hold said valve closed until said pressure reservoir is substantially full of lubricant, at which time the pressure in the reservoir will be sufficiently great to overcome the tension of said spring.

5. In a centralized lubricating system, a source of lubricant, a plurality of bearings requiring lubrication, a pump means for forcing lubricant from said source to said bearings, control means intermediate said pump means and said bearings, said control means comprising a reservoir having a resilient wall, a discharge opening, and a single valve controlling flow through said discharge opening, said valve being opened by lubricant pressure acting thereon when the pressure in said reservoir attains a predetermined maximum; and conduits connecting said pump means with said control means and the discharge opening of said control means with said bearings.

6. In a centralized lubricating system, the combination of a plurality of bearings requiring lubrication, a conduit system for supplying lubricant to said bearings, means in said conduit system for apportioning lubricant among said bearings, a pump for supplying lubricant to said conduit system, and an accumulator intermediate said pump and said conduit system, said accumulator comprising a resilient pressure reservoir communicating with the discharge outlet of said pump, a passageway from said reservoir to said conduit system, and a single valve normally closing said passageway, said valve having a backing spring exerting a predetermined pressure thereon, and said valve being opened by lubricant pressure when the pressure in said reservoir reaches a predetermined maximum.

7. In a device of the class described, the combination of a body having inlet and outlet ports, a pressure reservoir in communication with said inlet port, a passageway from said reservoir to said outlet port, said passageway having an enlarged portion, a valve in the enlarged portion of said passageway, a cylinder communicating with the enlarged portion of said passageway and with said outlet port, a piston-shaped member reciprocable in said cylinder and having a projection normally engaging said valve, and a spring for moving said member toward said valve and by means of said projection holding said valve in a position to close said passageway, the tension of said spring being sufficiently great relative to the area of said valve exposed to the pressure of the lubricant in said reservoir to hold the valve closed until the lubricant pressure in said reservoir attains a predetermined relatively high value.

8. In a device of the class described, the combination of a body having inlet and outlet ports, a reservoir in communication with said inlet port, a spring pressed piston in said reservoir, a passageway from said reservoir to said outlet port, said passageway having an enlarged portion, a valve in the enlarged portion of said passageway, a piston member having a part normally engaging said valve in position to cause the latter to close said passageway, and a spring for moving said member toward said valve to hold the latter in said position, said spring being of sufficient strength to maintain said valve closed until the lubricant pressure in said reservoir attains a predetermined value.

ERNEST W. DAVIS.